US011946622B2

(12) United States Patent
Li

(10) Patent No.: US 11,946,622 B2
(45) Date of Patent: Apr. 2, 2024

(54) ELECTRONIC CANDLE

(71) Applicant: L&L Candle Company, LLC, Brea, CA (US)

(72) Inventor: Xiaofeng Li, Shenzhen (CN)

(73) Assignee: L&L Candle Company, LLC, Brea, CA (US)

( * ) Notice: Subject to any disclaimer, the term of this patent is extended or adjusted under 35 U.S.C. 154(b) by 125 days.

(21) Appl. No.: 17/682,289

(22) Filed: Feb. 28, 2022

(65) Prior Publication Data

US 2022/0412539 A1 Dec. 29, 2022

Related U.S. Application Data

(63) Continuation of application No. 17/084,286, filed on Oct. 29, 2020, now Pat. No. 11,262,049, which is a continuation-in-part of application No. 16/531,433, filed on Aug. 5, 2019, now Pat. No. 10,871,274, which is a continuation of application No. 16/026,936, filed on Jul. 3, 2018, now Pat. No. 10,539,301.

(30) Foreign Application Priority Data

Sep. 30, 2017 (CN) ......................... 201710912420.0

(51) Int. Cl.

| | |
|---|---|
| *F21V 15/01* | (2006.01) |
| *F21S 6/00* | (2006.01) |
| *F21S 10/04* | (2006.01) |
| *F21V 23/04* | (2006.01) |

(52) U.S. Cl.
CPC .............. *F21V 15/01* (2013.01); *F21S 6/001* (2013.01); *F21S 10/04* (2013.01); *F21S 10/046* (2013.01); *F21V 23/0442* (2013.01); *F21V 23/0485* (2013.01)

(58) Field of Classification Search
CPC .. F21V 15/01; F21V 23/0442; F21V 23/0485; F21S 10/04
See application file for complete search history.

(56) References Cited

U.S. PATENT DOCUMENTS

| | | | | |
|---|---|---|---|---|
| 8,602,610 | B1 | 12/2013 | Lauer | |
| 11,262,049 | B2 * | 3/2022 | Li | F21S 10/04 |
| 2016/0057829 | A1 | 2/2016 | Li | |
| 2017/0067608 | A1 | 3/2017 | Patton | |
| 2017/0191630 | A1 | 7/2017 | Lentine | |

(Continued)

*Primary Examiner* — Kevin Quarterman
(74) *Attorney, Agent, or Firm* — Perkins Coie LLP

(57) ABSTRACT

Methods, systems and devices associated with an electronic candle are described. In one example, an electronic candle comprises a housing having a through-hole at its top and a component shell. The component shell encloses a transfer mechanism including a driver motor and one or more gears positioned inside the component shell, a light emitting component coupled to the transfer mechanism such that the transfer mechanism causes the light emitting component to move vertically up or down to protrude from the housing or to retract into the housing, a lid positioned inside the component shell and movable to remain in at least one of an open configuration or a closed configuration, and a controller configured to turn on or off the light emitting component. The candle also includes a controller configured to turn on or off the light emitting component.

17 Claims, 12 Drawing Sheets

(56) References Cited

U.S. PATENT DOCUMENTS

| | | | |
|---|---|---|---|
| 2019/0072251 | A1 | 3/2019 | Carpintero et al. |
| 2019/0101264 | A1 | 4/2019 | Li |
| 2020/0200368 | A1 | 6/2020 | Li |
| 2021/0048173 | A1 | 2/2021 | Li |

* cited by examiner

ELECTRONIC CANDLE

CROSS-REFERENCE TO RELATED APPLICATION(S)

This patent document is a continuation of U.S. patent application Ser. No. 17/084,286, filed on Oct. 29, 2020, which is a continuation-in-part of U.S. patent application Ser. No. 16/531,433, filed on Aug. 5, 2019, now U.S. Pat. No. 10,871,274, which is a continuation of U.S. patent application Ser. No. 16/026,936, filed Jul. 3, 2018, now U.S. Pat. No. 10,539,301, which further claims priority to Chinese Patent Application No. 201710912420.0, filed Sep. 30, 2017. The entire content of the before mentioned U.S. and Chinese patent applications is incorporated by reference in this patent document.

TECHNICAL FIELD

The present disclosure relates to electronic lighting technology, and more particularly, to an electronic candle.

BACKGROUND

The description of the background herein pertains to related art of the present disclosure and is only provided for explanation and facilitating understanding of the present disclosure. It should not be construed as the applicant's admission or presumption that the related art belongs to prior art available before the date of the first filing of the present disclosure.

In home facilities, public restaurants, churches, temples, large theme parks or urban public infrastructures, candles are used to provide lighting and to create ceremonial or romantic atmospheres. However, a conventional candle has a short lifetime and needs to be replaced frequently. Moreover, a potential risk of fire due to the fire flame prevents candles from being widely used.

With the development of new technologies, electronic candles driven by electrical power have been introduced to the market. These electronic candles can provide illumination and also possess aesthetic and decorative qualities, which has let to their wide-ranging uses in hotels, churches and homes. An electronic candle imitating real fire has a light emitter imitating an appearance of flame of a traditional candle. It can be bright and sometimes dim, and may even flicker, thus capable of creating a peaceful atmosphere for relaxation. However, dust can be accumulated on the electronic candle over time, and it is inconvenient, time-consuming and difficult to clean the electronic candle due to the special shape of its flame element.

SUMMARY

The present disclosure relates to electronic candles that, among other features and benefits, include a light emitting component that moves vertically up and down to, respectively, protrude from the electronic candle and to retract to within the electronic candle, as well as a movable lid that prevents dust and contaminants to enter inside the electronic candle housing.

In one example aspect, an electronic candle comprises a housing having a through-hole at its top and a component shell. The component shell encloses a transfer mechanism including a driver motor and one or more gears positioned inside the component shell, a light emitting component coupled to the transfer mechanism such that the transfer mechanism causes the light emitting component to move vertically up or down to protrude from the housing or to retract into the housing, a lid positioned inside the component shell and movable to remain in at least one of an open configuration or a closed configuration, and a controller configured to turn on or off the light emitting component. The lid comprises a reposition mechanism and two sections. The reposition mechanism is located between an inner wall of the component shell and one of the two sections. The reposition mechanism is in a compressed state to retain the movable lid in the open configuration and to allow part of the light emitting component protrude from the housing and is further configured to transition to a decompressed state to exert a force to at least one section of the lid to allow the two sections come together to substantially close the through-hole. The candle also includes a controller configured to turn on or off the light emitting component.

Another aspect of the disclosed embodiments relates to an electronic candle that includes a housing having a through-hole at its top, a transfer device including a driver motor and one or more gears positioned inside the housing, and a light emitting component coupled to the transfer device such that the transfer device causes the light emitting component to move vertically up or down to protrude from the housing or to retract into the housing. The electronic candle further includes a movable lid positioned inside the housing and movable to remain in at least one of an open configuration or a closed configuration. The movable lid includes two sections, where each section including a top portion and a bottom portion. The top portions are configured to come together to substantially close the through-hole in the closed configuration and move away from one another to allow at least a section of the light emitting component protrude from the housing in the open configuration. Each of the bottom portions extends downward away from the top surface of the electronic candle and is coupled to the light emitting component such that upon upward movement of the light emitting component the bottom portions move sideways to allow the light emitting component to move up within the housing. The electronic candle also includes a controller configured to turn on or off the light emitting component.

In some embodiments, the electronic candle further includes a wick component coupled to the movable lid, where the wick component is configured to retract into the housing in the open configuration and to protrude from the housing in the closed configuration. In some embodiments, the wick component includes a wick, and a first spring coupled to the wick and the movable lid. The first spring accumulates energy when the movable lid is in the open configuration and releases the accumulated energy when the movable lid transitions to the closed configuration.

In some example embodiments, the electronic candle includes a switch coupled to the movable lid to trigger the closing or opening of the movable lid. In one exemplary embodiment, the electronic candle includes a spring coupled the movable lid and the housing, where the spring accumulates energy when the movable lid is in the open configuration and releases the accumulated energy when the movable lid transitions to the closed configuration. In one configuration of the above embodiment, the housing of the electronic candle includes a position limiting pole and a guide slot. The position limiting pole is positioned inside the guide slot and is movable within the guide slot, and the spring has one end attached to the position limiting pole and the other end attached to the movable lid. In one example embodiment, the two sections of the movable lid form a channel within which the light emitting component is positioned and rests against each of the two sections. In such an embodiment, when the transfer device is driving the light emitting component to protrude from the housing, the light emitting component applies a force to each of the two sections of the movable lid such that the two sections slide within the housing to open the through-hole.

In some embodiments, each of the bottom portions of the movable lid slides against a housing of the light emitting components as the light emitting component moves upward or downward within the electronic candle housing. In some embodiments, the movable lid includes an opening that is formed when the top portions thereof come together in the closed configuration. The opening is configured to allow a wick to protrude upward from the opening. The wick includes a dark section resembling a wick of a used candle.

In some embodiments, the light emitting component includes a flame sheet that resembles a candle flame. In one example embodiment, the light emitting component includes one or more light sources to illuminate the flame sheet. According to some embodiments, the electronic candle further includes a sound sensor that is positioned inside the housing and is coupled to the controller. The sound sensor is configured to receive an external input and convert the received external input into an electrical signal, where an operation of the electronic candle is controlled in response to the electrical signal. In one example embodiment, the sound sensor is positioned inside an installation slot on a base on the light emitting component.

According to some embodiments, the transfer device includes a rack that is configured to engage the one or more gears and to move within a sliding channel within the housing to cause the light emitting component to move up or down within the housing. In some embodiments, each of the bottom portions includes a side that is formed at a slanted angle with respect to a line that vertically passes through the center of the candle device. In some example embodiments, each of the bottom portions is coupled to a corresponding slider that is positioned within a corresponding sliding slot, and each of the sliders is configured to slide on the corresponding sliding slot upon movement of the light emitting element. In some embodiments, the light emitting component includes at least one light source that is configured to project light onto a flame element when the flame element is positioned to protrude from the housing, and to turn off the projected light as the flame element is retracted into the housing.

BRIEF DESCRIPTION OF THE DRAWINGS

The above and/or additional aspects and advantages of the present disclosure will become more apparent and easy to understand from the following description taken in conjunction with the figures.

DETAILED DESCRIPTION

Figure 1:
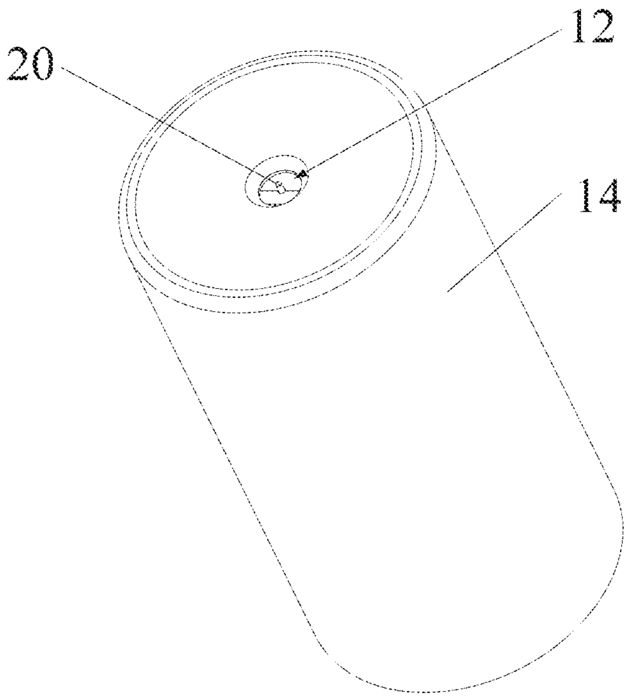
FIG. 1 is a schematic diagram showing an electronic candle in a first state in accordance with an example embodiment.
Figure 2:
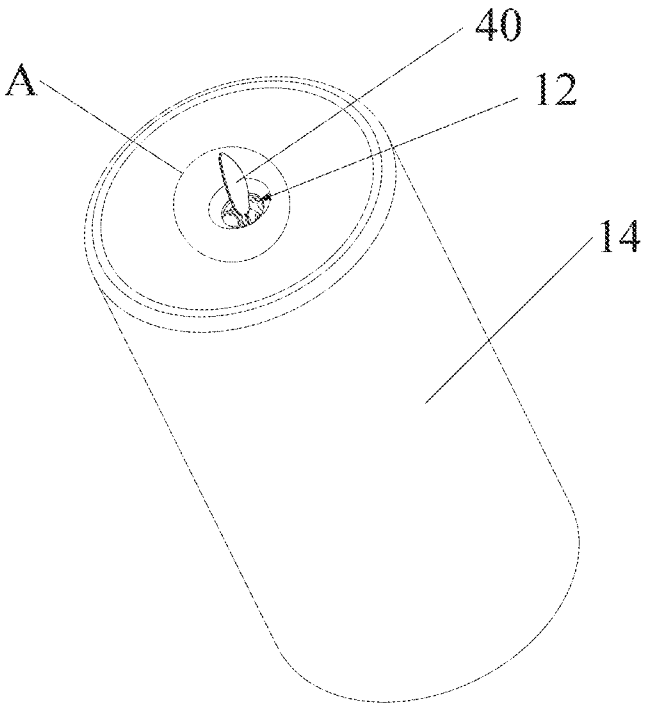
FIG. 2 is a schematic diagram showing electronic candle in a second state in accordance with an example embodiment.
Figure 3:
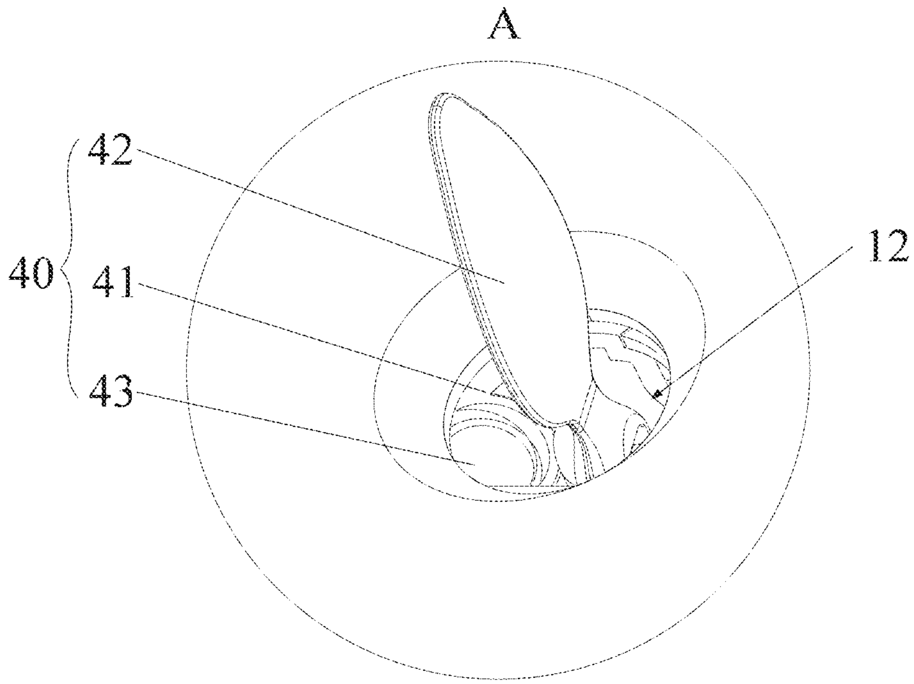
FIG. 3 is a schematic diagram showing an enlarged view of the section identified as A in FIG. 2.

In order to facilitate the understanding of the features and advantages of the disclosed technology, the present disclosure will be explained with reference to the example figures and embodiments. It is to be noted here that the embodiments and features can be combined with each other, provided that they do not conflict. Thus, the scope of the present disclosure is not limited to the embodiments disclosed below.

As shown in FIGS. 1-11, an electronic candle according to the present disclosure includes: a housing 10, a transfer device 50, a light emitting component 40, a closing device 30 and a control device or a controller (not shown). The closing device is also referred to as a lid, or a movable lid, which as will be understood from the disclosed embodiments, operates a lid (or a door) to cover the through hole that is positioned on top of the electronic candle, and to open so as to allow a light emitting component to protrude from the electronic candle housing. The transfer device or transfer mechanism can include a plurality of gears that are couple to a motor (or a moving mechanism) to physically move the light emitting components up and down in the electronic candle's housing.

As shown in, for example, FIGS. 1-6, the housing 10 has a through-hole 12 at its top. The transfer device 50 is provided inside the housing 10. The light emitting component 40 is coupled to the transfer device 50 such that the transfer device 50 can control the position of the light emitting component 40 to protrude from the housing 10 or to retract into the housing 10. The closing device 30 is provided on the housing 10 for opening or closing the through-hole 12. The control device is configured to turn on or off the light emitting component 40.

In the disclosed electronic candle, when the electronic candle is turned off, the transfer device 50 can cause the light emitting component 40 to retract into the housing 10 and the closing device 30 can close the through-hole 12, so as to prevent dust from entering the housing 10. When the electronic candle is turned on, the closing device 30 can open the through-hole 12 and the transfer device 50 can cause the light emitting component 40 to protrude from the housing 10. When the light emitting component 40 reaches a predetermined position, the transfer device 50 stops and the control device turns on the light emitting component 40. When the electronic candle is turned off, the light emitting component 40 retracts into the housing 10, so as to prevent dust from falling onto the light emitting component 40. In this way, a user does not need to clean the electronic candle. In an embodiment of the present disclosure, when then the through-hole 12 is not fully opened, the light emitting component 40 does not completely protrude from through-hole, so as to avoid the risk of collision between the light emitting component 40 and the closing device 30.

In an embodiment of the present disclosure, a control device turns on or off the light emitting component 40. In particular, when the transfer device 50 controls the position of the light emitting component 40 to protrude from the housing, the control device turns on the light emitting component 40 to imitate an appearance of a real flame. On the other hand, when the transfer device 50 controls the positioning of the light emitting component 40 to retract into the housing 10, the control device turns off the light emitting component 40. Subsequently, after the transfer device 50 has caused the light emitting component 40 to protrude from the housing, the control device turns on the light emitting component 40 to imitate an appearance of a real flame. It can be appreciated by those skilled in the art that the light emitting component 40 can be turned on at any time when it is protruding from the housing, and turned off at any time when it is retracting into the housing. The time at which the light emitting component 40 is turned on and off can be set as desired.

In some embodiments of the present disclosure, as shown in FIGS. 1, 4-6 and 9-11, the electronic candle can further include a wick component 20 provided on the closing device 30. The transfer device 50 can control the positioning of the wick component 20 to retract into the housing 10 or to protrude from the housing 10. After the light emitting component 40 has retracted into the housing 10, the wick component 20 can protrude from the housing 10 to imitate an appearance of wick after a candle has been extinguished to resemble a real candle. In such embodiments, the wick component 20 is provided primarily to imitate the appearance of a wick of a real candle after it has been extinguished. To this end, a wick hole that can be provided on the closing device 30. In some embodiments, as shown in FIGS. 4-6 and 8-11, the wick component 20 includes a wick section 21 and a first restoration member 22. In particular, the wick section 21 is positioned above the closing device 30 and is black. The first restoration member 22 is positioned between the wick section 21 and the closing device 30. The first restoration member 22 accumulates power when the closing device 30 opens the through-hole 12 and releases the accumulated power when the closing device 30 closes the through-hole 12. The wick section 21 is black to imitate an appearance of a wick of a real candle that has been lit and then extinguished. Of course, the wick can alternatively be white to imitate an appearance of a wick of a real candle that has not been lit. The wick section 21 can be constructed into an appropriate shape to be adapted to a particular installation position or installation scheme.

Figure 6:
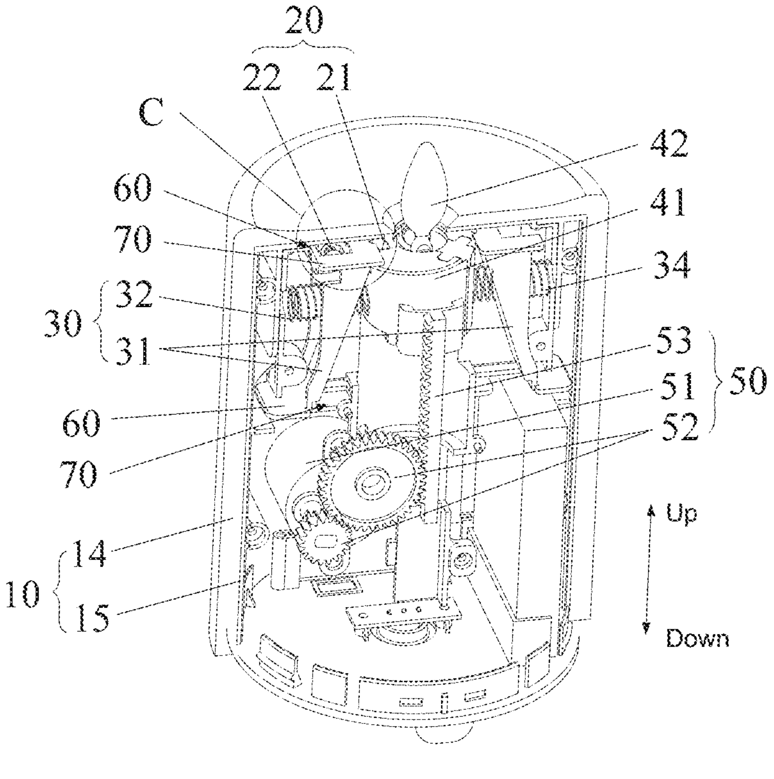
FIG. 6 is a schematic diagram showing some of the components of an electronic candle with the flame element that is fully protruding from the electronic candle body in accordance with an example embodiment.
Figure 7:
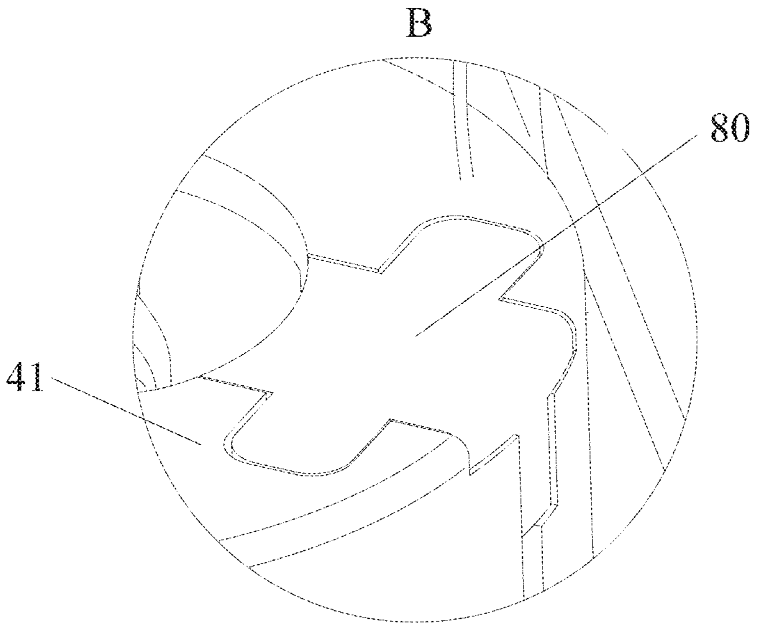
FIG. 7 is a schematic diagram showing an enlarged view the section identified as B in FIG. 5.
Figure 8:
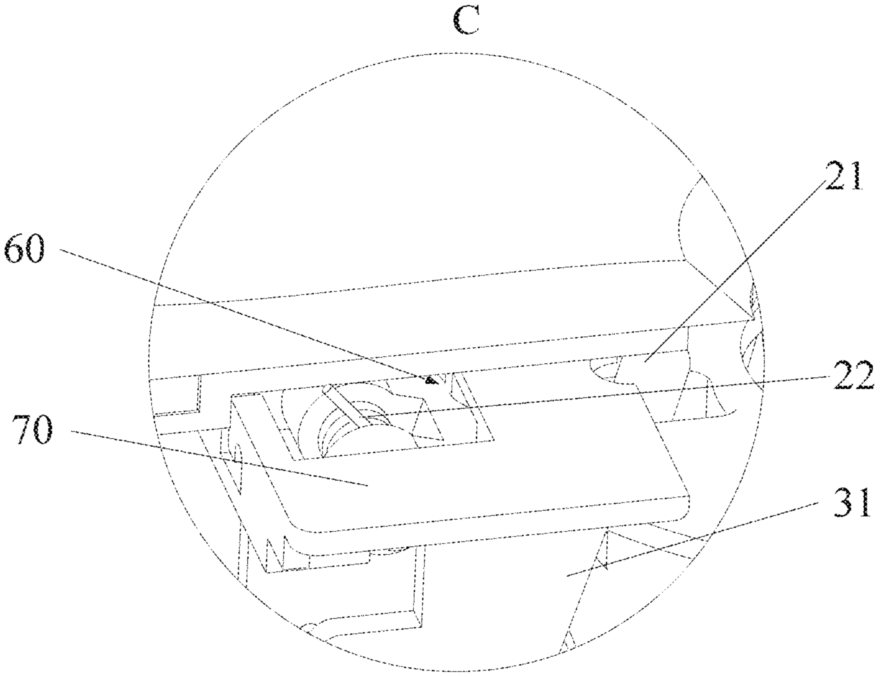
FIG. 8 is a schematic diagram showing an enlarged view of the section identified as C in FIG. 6.

In particular, the wick section 21 can include an imitation wooden sheet, a wooden sheet in an original color, a wooden material of a cross shape or any other shape or material. For example, when the wick section 21 is hinged to the closing device 30, the wick section 21 can have an L shape, with one end hinged to the closing device 30 and the other end protruding from the housing 10 via the wick hole on the closing device 30. In some embodiments, as shown in FIGS. 6 and 8, the first restoration member 22 can be a torsional spring provided at the position where the wick section 21 and the closing device 30 are hinged. The torsion of the torsional spring is applied to the wick section 21 such that the wick section 21 can remain protruding from the housing 10. As shown in FIGS. 8-11, the wick section 21 is positioned on the closing device 30 and the torsional spring has one end connected to the closing device 30 and the other end connected to the wick section 21. When the closing device 30 is opening the through-hole 12, the wick section 21 moves with the closing device 30; the wick section 21 is in contact with the top plate of the housing 10, and the wick section 21 moves downwards to hide in the housing 10 as the torsional spring is wound up, accumulating torsional energy. When the closing device 30 is closing the through-hole 12, the wick section 21 moves with the closing device 30, and the contact between the wick component 21 and the top plate gradually disappears to allow the wick component to protrude from the housing 10 due to the action of the torsional spring. Of course, a tension spring or a thrust spring can be provided at an appropriate position to maintain the wick section 21 protruding from the housing 10.

In some embodiments, when the through-hole 12 is being opened, the wick section 21 moves horizontally with the closing device 30 and comes in contact with a wall of the through-hole 12. The wick section 21 deforms slightly forming an angle larger than 0 between the wick section 21 and the vertical direction. Thus, when the wick section 21 continues to move horizontally, the vertical component of the force applied by the wall of the through-hole to the wick section 21 causes the wick section 21 to move downwards, so as to hide in the housing 10. In some embodiments, a wall of the through-hole 12 and a corresponding portion of the wick section 21 form a guide surface as an inclined surface or a curved surface. In other words, the inner wall of the through-hole and the wick section 21 make contact with each other on an inclined surface or a curved surface, such that the wick can hide in the housing more smoothly and conveniently.

In some embodiments, a linkage device is provided between the wick component and the light emitting component. The user can directly press the wick component to hide it in the housing and the linkage device automatically drives the light emitting component to protrude from the housing. A user can directly press the light emitting component to hide it in the housing and the linkage device automatically drives the wick component to protrude from the housing. The linkage device can have various forms such as a lever mechanism or a gear mechanism. Alternatively, when the light emitting component and the wick component are driven by separate driving mechanisms, a control chip can control the respective driving mechanisms to allow the movements to be synchronized. For example, when the wick component is pressed, a first moving procedure can be triggered, e.g., the wick component can be driven by its driving mechanism to hide in the housing, while the light emitting component can be driven by its driving mechanism (e.g., the transfer device) to protrude from the housing. When the light emitting component is pressed, a second moving procedure can be triggered, e.g., the light emitting component can be driven by its driving mechanism (e.g., the transfer device) to hide in the housing, while the wick component can be driven by its driving mechanism to protrude from the housing. Of course, when the control chip controls the respective driving mechanisms in a coordinated fashion, the respective moving procedures can be triggered in other ways than pressing the light emitting component and the wick component as described above. For example, they can be triggered by actuating mechanical switches or electronic switches, or by means of sound, light or force. It can be seen from the above embodiments that the drive mechanisms for moving respective components of the electronic candle can be use comprise electrical or mechanical energy. For example, the components can be driven by a driver motor that uses electrical energy, by an energy accumulating mechanism such as a spring, or manually by the user (e.g., by manually rotating a gear mechanism).

In some embodiments, the electronic candle includes a switch connected to the closing device 30 for controlling the movement of the closing device 30. In particular, when the light emitting component 40 is protruding from the housing 10, the switch controls the closing device 30 open the through-hole 12 and the transfer device 50 controls the light emitting component 40 to protrude from the through-hole 12. On the other hand, when the transfer device 50 is driving the light emitting component 40 to hide in the housing 10, the switch controls the closing device 30 to close the through-hole 12 and the transfer device 50 causes the light emitting component 40 to hide in the housing 10, thereby preventing dust from falling onto the light emitting component 40. In some embodiments, the switch is connected to each of the closing device 30 and the wick component 20, for controlling the movement of each of the wick component 20 and the closing device 30. In particular, after the light emitting component 40 has retracted into the housing 10, the switch controls the closing device 30 to close the through-hole 12 while controlling the wick component 20 to protrude from the housing 10. Conversely, when the light emitting component 40 is protruding from the housing 10, the switch can control the closing device 30 to open the through-hole 12 while controlling the wick component 20 to hide in the housing 10. In an embodiment of the present disclosure, the switch includes a motor and a transmission mechanism. The motor is connected to the transmission mechanism, which is in turn connected to a driver, e.g., the closing device. Alternatively, the transmission mechanism can be connected to each of the closing device and the wick component. The transmission mechanism can be one or more of a gear member, a spring member, a cam member or a connecting rod member.

In some embodiments, the transfer device 50 is connected to the closing device 30 in a transmissive manner, i.e., the transfer device 50 and the closing device 30 are linked. In particular, when the transfer device 50 is driving the light emitting component 40 to move upwards, the transfer device 50 drives the closing device 30 to open the through-hole 12. Conversely, when the transfer device 50 is driving the light emitting component 40 to move downwards, the transfer device 50 drives the closing device 30 to close the through-hole 12. In some embodiments, the transfer device 50 is connected to each of the closing device 30 and the wick component 20 in a transmissive manner, i.e., both the closing device 30 and the wick component 20 are connected to the transfer device 50. When the transfer device 50 is driving the light emitting component 40 to move upwards and downwards, it also drives the closing device 30 and the wick component 20 to move. In particular, when the light emitting component 40 is protruding from the housing 10, the transfer device 50 controls the wick component to retract it into the housing 10 while controlling the closing device 30 to open the through-hole 12. Conversely, when the light emitting component 40 is retracting into the housing 10, the transfer device 50 causes the wick component 20 to protrude from the housing while controlling the closing device 30 to close the through-hole 12. In some embodiments, the transfer device 50 is connected to the closing device 30, which is in turn connected to the wick component 20. The transfer device 50 controls the movement of the closing device 30, which in turn drives the movement of the wick component 20. In particular, when the light emitting component 40 is protruding from the housing 10, the transfer device 50 controls the closing device 30 to open the through-hole 12 and the closing device 30 drives the wick component to retract into the housing 10. On the other hand, when the light emitting component 40 is retracting into the housing 10, the transfer device 50 controls the closing device 30 to close the through-hole 12 and the closing device 30 drives the wick component 20 to protrude from the housing. It can be appreciated by those skilled in the art that the transfer device 50 may be connected to the wick component either directly or indirectly. As long as the transfer device 50 can control the wick component 20 to protrude from or hide in the housing 10.

As described above, the movable components in the present disclosure, such as the transfer device 50, the closing device 30 and the wick component 20 can utilize mechanical linkages for achieving the respective actions in different states. In particular, such linkages can be implemented using one or more of a gear member, a spring member, a cam member or a connecting rod member. Further, these movable components can move independently from each other, or in cooperation with each other, for achieving the respective actions in different states. In particular, the timing of movements and trajectories of the respective movable components that move independently from each other can be controlled according to a defined procedure to allow coordination of the components.

In some embodiments, the transfer device 50 drives the light emitting component 40 to move upwards or downwards, so as to protrude from or retract into the housing 10. In some instances, when the light emitting component 40 is driven by the transfer device 50 to move vertically, it may also move horizontally. Thus, the light emitting component 40 may have at least the following movement modes. The transfer device 50 can drive the light emitting component 40 to protrude from the housing 10 or retract into the housing 10 in the vertical direction; the transfer device 50 can drive the light emitting component 40 to protrude from the housing 10 or retract into the housing 10 in an oblique direction; the transfer device 50 can first move horizontally and then vertically to drive the light emitting component 40 to protrude from the housing 10 or retract into the housing 10. That is, the movement trajectory of the light emitting component 40 can in a vertical straight line, an oblique line, a broken line, or a curved line.

In some embodiments, as shown in FIGS. 4-6 and 9-11, the closing device can include a closing member 31 and a second restoration member 32. In particular, the closing member 31 is positioned within the housing 10 and is slidable within the housing 10 to open or close the through-hole 12. The second restoration member 32 is positioned between the closing member 31 and the housing 10. When the closing member 31 opens the through-hole 12, the closing member 31 moves such that the second restoration member 32 is wound up. On the other hand, when the closing member 31 closes the through-hole 12, the second restoration member 32 applies a force to the closing member 31 such that the closing member 31 closes the through-hole 12 to prevent dust from falling onto the light emitting component 40.

Figure 4:
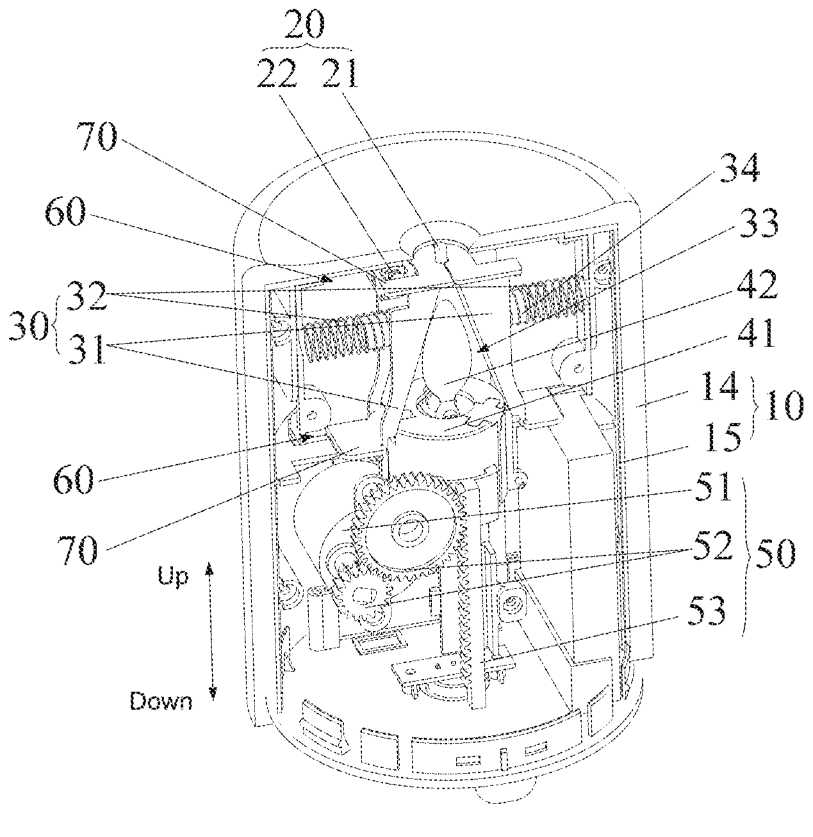
FIG. 4 is a schematic diagram showing some of the components of an electronic candle with the flame element in retracted position in accordance with an example embodiment.
Figure 5:
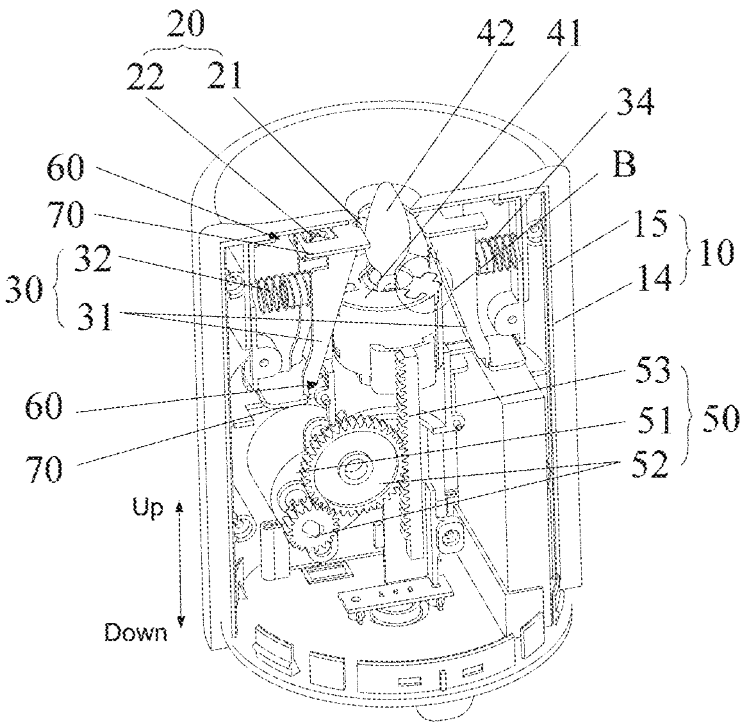
FIG. 5 is a schematic diagram showing some of the components of an electronic candle with the flame element that is partially protruding from the electronic candle body in accordance with an example embodiment.

In some embodiments, as shown in FIGS. 4-6, a sliding slot 60 can be positioned within the housing 10 and a slider 70 corresponding to the sliding slot 60 can be provided on the closing member 31. The slider 70 is slidable within the sliding slot 60 such that the closing member slides within the housing, which prevents the closing member 31 from swaying while it is moving, so as to ensure its stability during the movement. At the same time, the noise generated due to the movement of the closing member 31 is reduced, which improves the operations of the device.

Figure 9:
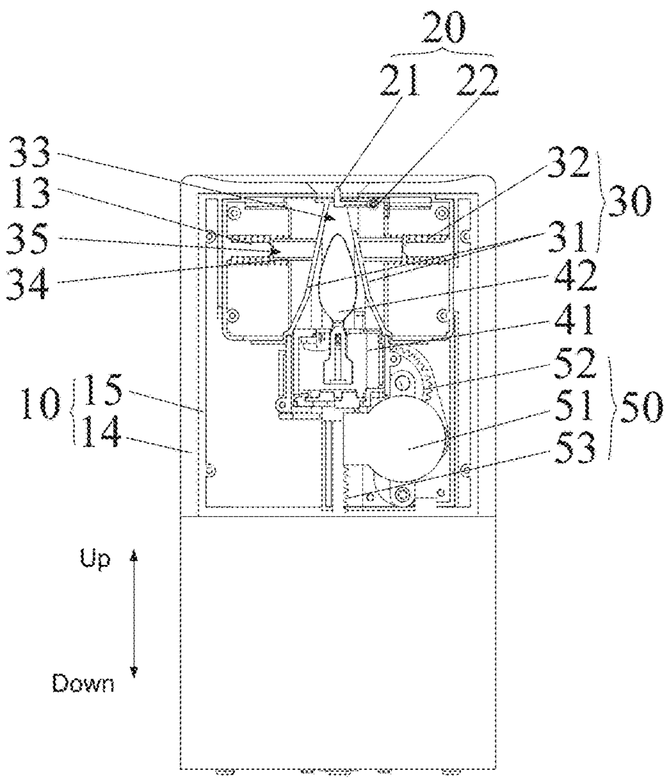
FIG. 9 is a schematic diagram showing some of the components of an electronic candle with the flame element in retracted position in accordance with another example embodiment.
Figure 10:
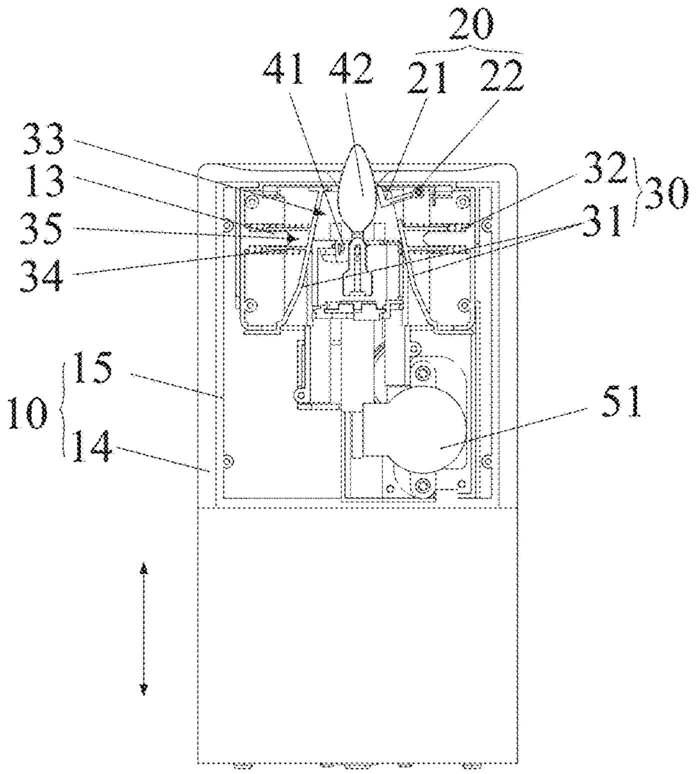
FIG. 10 is a schematic diagram showing some of the components of an electronic candle with the flame element that is partially protruding from the electronic candle body in accordance with another example embodiment.
Figure 11:
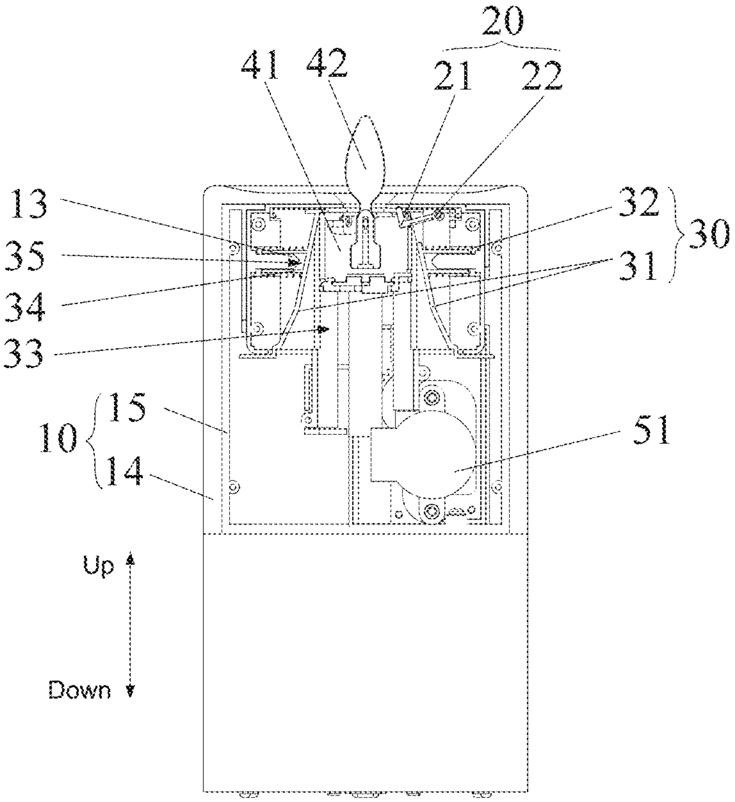
FIG. 11 is a schematic diagram showing some of the components of an electronic candle with the flame element that is fully protruding from the electronic candle body in accordance with an example embodiment.

In some embodiments, as shown in FIGS. 9-11, a second restoration member 32 is a spring. A position limiting pole 13 is positioned within the housing 10. In particular, the position limiting pole 13 can be provided on an inner wall of the housing 10. A guide slot 35 is provided on the closing member 31. The position limiting pole 13 is inserted into the guide slot 35 and is movable within the guide slot 35. The spring has one end that is connected to the position limiting pole 13 and rests against the inner wall of the housing 10, and the other end is connected to the closing member 31 and rests against the closing member 31. Preferably, a guide pole 34 can be provided on the closing member 31 and the guide slot 35 can be positioned on the guide pole 34. The position limiting pole 13 can be inserted into the guide slot 35 and is movable within the guide slot 35. The spring has one end attached to the position limiting pole 13 and rests against the inner wall of the housing 10, and the other end attached to the guide pole 34 and rests against the closing member 31. The combination of the position limiting pole 13 and the guide slot 35 defines the movement trajectory of the closing member 31. This prevents the closing member 31 from swaying while it is moving, so as to ensure its stability during movement. Further, when the closing member 31 opens the through-hole 12, the distance between the closing member 31 and the inner wall of the housing 10 is shortened and the spring is compressed by the closing member 31. On the other hand, when the closing member 31 closes the through-hole 12, the elastic force of the spring is applied to the closing member 31 such that the closing member 31 is moved, subject to the action of the spring, to close the through-hole 12 to prevent dust from falling onto the light emitting component 40.

In some embodiments, a support is used to fix and assemble the transfer device 50, the light emitting component 40, the closing device 30 and the wick component 20 of the electronic candle. In particular, the support and the housing 10 can be formed as one piece and the structures needed to accommodate and assemble the transfer device 50, the light emitting component 40, the closing device 30 and the wick component 20 are formed on the inner wall of the housing 10. In some embodiments, a separate support can be provided within the housing for placement and assembly of the transfer device 50, the light emitting component 40, the closing device 30 and the wick component 20. For example, in one embodiment, the electronic candle can be divided into two parts: the housing and a body including the components other than the housing 10, such as the transfer device 50, the light emitting component 40, the closing device 30 and the wick component 20, that are installed on the support and connected with the support as one piece. In this embodiment, the housing 10 can be removed from the body of the electronic candle. The housing 10 can be affixed to the body of the electronic candle via a self-locked switch; the user can remove the housing from the body of the electronic candle using the self-locked switch and affix a new housing to the body of the electronic candle using the self-locked switch. Alternatively, or additionally, the housing and the body of the electronic candle can be connected by means of a clamp connection or a screw connection.

In some embodiments, as shown, for example, in FIGS. 1, 4-6 and 9-11, the closing device 30 can include two closing members 31 with a channel 33 formed between them. The light emitting component 40 is positioned within the channel 33 and rests against each of the two closing members 31. When the transfer device 50 is driving the light emitting component 40 to move upwards, a base 41 of the light emitting component 40 applies forces, in the left and right directions, to the closing members 31, respectively, such that the closing members 31 slide within the housing 10 to gradually open the through-hole 12. When the light emitting component 40 reaches a predetermined position, the through-hole 12 is fully opened. Further, in order to make the wick to be at the center of the through-hole, the closing device 30 can include two closing members 31 that are arranged symmetrically. A wick hole is formed when the two closing members 31 come together, such that the wick can be at the center of the through-hole. The closing member 31 can be constructed in an appropriate shape, so as to be adapted to a particular installation position or installation scheme. For example, the closing member 31 may include a cover section or component, and a drive section or component. A driving force is applied to the drive section to drive the entire closing member 31 to move within the housing, such that the cover section can cover or open the through-hole 12. In order to cover the through-hole 12, the cover section can have a shape that matches the shape of the through-hole 12. Preferably, the cover section can be a flat plate. The drive section is the component to which the force is applied, and can be constructed in a shape that is suitable for receiving the force. For example, it can have shaped as a guide pole 33 in the above embodiment, or a guide structure that matches the light emitting component 40. In some embodiments that include more than one closing member, each closing member receives an equal force while the through-hole is being opened or closed, so as to ensure that each closing member move symmetrically with the other closing member(s). In the above embodiments, the transfer device 50 controls the closing member 31, by moving the light emitting component 40, to open or close the through-hole 12. The switch and the transfer device can directly control the closing member 31 to open or close the through-hole 12.

In some embodiments, as shown, for example, in FIGS. 2, 4-6 and 9-11, the light emitting component 40 can include a base 41 and a light emitter. The light emitter has a magnet provided thereon. The light emitter is provided on the base 41 and can sway with respect to the base 41 such that an electromagnet and the magnet can attract or repel. The light emitting component can include a flame-shape element and a light source 43. Preferably, the flame-shape element can be a flame sheet 42. The electromagnet is provided on the base 41. The flame sheet 42 has a magnet at its bottom. The flame sheet 42 is provided on the base 41 and can sway with respect to the base 41 such that the electromagnet and the magnet can attract or repel. The light source 43 is provided on the base 41 and irradiates the flame sheet 42. When the light emitting component 40 protrudes from the housing 10, the electromagnet attracts the magnet to stabilize the flame sheet 42. As such, the flame sheet 42 is prevented from swaying while it is moving, which reduces the likelihood that the flame sheet 42 would sway, hit against another section of the housing 10, and damaged as a result or prevent it from protruding smoothly from the through-hole 12. When the flame sheet 42 rises to a predetermined position, the current in the electromagnet, and thus the polarity of the electromagnet, is changed and an attractive force between the electromagnet and the magnet is changed into a repulsive force. With the repulsive force, the flame sheet 42 will sway randomly, making it look more like a real candle flame. In another embodiment, the flame sheet 42 can be driven differently, e.g., by an airflow at a predetermined speed as produced by a fan or inputted from outside. In an embodiment, the flame sheet 42 has a black portion at its bottom to imitate a black portion of a wick 21 of a real candle that has been lit and then extinguished. The black portion can protrude from the through-hole 12.

In some embodiments, the electronic candle can further include a sensor. The control device is configured to control an operational state of the electronic candle. The sensor is configured to receive an external input and convert the received external input into an electrical signal for inputting to the control device. The sensor collects an external signal such as sound, air flow and pressure, and converts the external signal into an electrical signal. The control device controls the operation state of the electronic candle in response to the electrical signal. In particular, the user can control the on or off functionality of the electronic candle or control its operation state by means of voice control or pressure control. Alternatively, the user can blow or fan the electronic candle to extinguish its flame. The sensor collects air flow and converts it into an electrical signal. The control device receives the signal and extinguishes the flame of the electronic candle in response to the signal. Further, the control device can control a smoke generator to generate smoke, so as to imitate the smoke generated when a real candle is extinguished, making it look more like a real candle.

In some embodiments, the senor is a capacitive sensor. The user touches the electronic candle, which causes a change in capacitance of the capacitive sensor. The change in capacitance is converted into an electrical signal that is inputted to the control device, which can allow the user to control a functionality of the electronic candle by touching it. For example, when the user touches or taps the housing, it can cause a change in capacitance of the capacitive sensor. An electrical signal is generated and received by the control device. The control device controls the operations of the electronic candle based on the signal, e.g., controlling the on/off or a timer functionality of the electronic candle. For example, the user can tap the housing once to turn on the electronic candle and tap the housing one more time to turn it off. The user can tap the housing a number of times to start a timer, or keep touching it for a long time to start setting of the operation mode. To control the electronic candle by touching could be beneficial. Conventionally, in order for an electronic candle to be aesthetic, a control switch is typically provided on the bottom of electronic candle. However, in such a configuration, the user needs to pick up the candle to move or activate/deactivate the switch, which could be cumbersome. With the capacitive sensor, the user can control the electronic candle by directly touching the position corresponding to the capacitive sensor on the surface of the candle without picking it up. The capacitive sensor can be provided anywhere on the electronic candle. In some embodiments, the capacitive sensor is provided on an outer surface of the electronic candle and has a non-metallic layer on its surface. The non-metallic layer can comprise the same material as the housing, e.g., wax or plastic, so as to ensure the integrity and aesthetic of the appearance of the electronic candle. The sensor can alternatively be a pressure sensor to sense the pressure applied to the electronic candle and convert the pressure into an electrical signal for inputting into the control device. The user can control the operations or a functionality of the electronic candle by touching it.

In some embodiments, the sensor can be a sound sensor configured to sense a sound wave and convert it into an electrical signal for inputting into the control device. The user can control an operation of the electronic candle with his/her voice. In particular, the sound sensor can capture a sound wave from the user and convert it into an electrical signal. The control device receives the electrical signal and controls the operation of the electronic candle based on the signal, e.g., controls on/off, or a timer functionality of the electronic candle. In particular, the user can awaken the electronic candle by voice, e.g., by saying “Hello Scent” or “Hello Candle”, or by a touch operation. It can be appreciated by those skilled in the art that the above voice control and control function are exemplary only and the user can control any other functions as desired by using a voice control product or set any desired words recognizable by the electronic candle. The sound sensor can be a microphone. As shown in, for example, FIGS. 5 and 7, an installation slot and a fixed cover 80 corresponding to the installation slot can be provided on the base. The microphone can be installed within the installation slot and a number of holes can be provided on the fixed cover 80. As such, the microphone can be protected so as to prolong its lifetime while facilitating its assembly or removal, which improves the production efficiency. The sound sensor can be positioned in any one of multiple locations on the electronic candle and can recognize a number of languages, such as Chinese, English, Japanese, Korean, etc. While the user is interacting with the electronic candle by voice, the electronic candle can feed voice content back to the user, thereby allowing for voice interaction. The electronic candle may have a power amplifier circuit and a speaker therein.

In some embodiments, the thickness of the flame sheet 42 is not uniform and is preferably thinner in its upper portion and thicker in its lower portion. Alternatively, the flame sheet 42 can have a thicker middle portion and thinner end portions, so as to imitate light effects at different heights of a flame, thereby making it look more like a real flame. In an embodiment, the flame sheet 42 has a pivot hole and a support element, e.g., a V-shape rigid pole, can be provided on the base 41. That is, the middle portion of the support element, in its stable state, can serve as an end portion which is at a lower position to allow the flame sheet 42 to be supported by the support element. In one embodiment, the lowest point of the support element has unequal distances to its two ends, i.e., it is closer to one of the ends than to the other, such that light source 43, e.g., a Light Emitting Diode (LED), can better illuminate to the light emitting upper portion of the flame-shape element. In another embodiment, the support element can be a soft thread that passes through the flame sheet 42 and has its two ends fixed at two ends of the housing 10, respectively, such that the flame sheet 42 can pivot about the support element. It can be appreciated by those skilled in the art that the flame-shaped element is not limited to the flame sheet and can be e.g., a three-dimensional flame or a flame consisting of several plates. In an embodiment, the light source 43 can be fixed at the through-hole 12. When the flame sheet 40 rises to a predetermined position, the light source 43 irradiates the flame sheet 42. In one embodiment, the flame-shaped element can be a three-dimensional flame, in which case the light source 43 can be provided inside the flame-shape element. It can be appreciated by those skilled in the art that the light source 43 can be provided at various positions, as long as it can irradiate the flame-shaped element.

In some embodiments, as shown, for example, in FIGS. 4-6 and 9-11, the transfer device 50 includes: a driver 51, a gear component 52 and a rack 53.

The gear component 52 is connected to the driver 51. The rack 53 is fixed to the light emitting component 40 and engaged with the gear component 52. The rack 53 is slidable within the housing 10 for controlling the light emitting component 40 to protrude from the housing 10 or retract into the housing 10. The driver 51 drives the gear component 52 to rotate and the gear component 52 drives the rack 53 to move upwards. The closing device 30 is configured to open the through-hole 12 and the light emitting component 40 to move upwards to protrude from the housing 10. When the light emitting component 40 rises to the highest position, the driver 51 stops and the control device turns on the light emitting component 40 to imitate a real candle that has been lit. Conversely, the control device can turn off the light emitting component 40, the driver 51 can drive the gear component 52 to rotate and the gear component 52 can drive the rack 53 to move downwards, thereby driving the light emitting component 40 to retract into the housing 10. The closing device 30 can subsequently close the through-hole 12. When the light emitting component 40 falls to its lowest position, the driver 51 stops. The gear component 52 includes two gears: a first gear installed on the driver 51 and a second gear engaged with the first gear and the rack 53, respectively. The diameter of the first gear is smaller than that of the second gear, such that the light emitting component 40 can rise or fall steadily. In one embodiment, the driver is a motor and preferably a servo motor having high control speed, high positional accuracy, high operation stability and low noise.

In some embodiments, the base 41 includes a casing on which the rack 53 is affixed, so as to provide the connection between the transfer device and the light emitting component. The casing includes two half-casings. This structure is simple and easy to assemble, thereby improving the production efficiency of the candle product, and reducing the production and manufacturing costs of the product. In one embodiment, the base 41 is connected to a power source via a soft wire, which mitigates the damage to the wire due to deformation during the movement of the base 41, thereby prolonging the lifetime of the wire. Further, the length of the wire can be longer than the movement range of the base 41, so as to prevent the wire from being torn.

In some embodiments, a tab can be provided on the rack 53 and a slot can be provided on the light emitting component 40. The tab can be inserted into the slot so as to connect the rack 53 to the light emitting component 40. The connection between the tab and the slot has a simple structure and is easy to assemble, thereby improving the production efficiency of the product, and reducing the production and manufacture costs. Moreover, such a connection provides a reliable means for connecting the rack 53 and the light emitting component 40 and reduces the risk that the light emitting component 40 would sway while moving.

In some embodiments, a sliding channel is provided within the housing 10 and the rack 53 is provided within the sliding channel and can slide within the sliding channel. The sliding channel defines the movement trajectory of the rack 53 and prevents the rack 53 and the light emitting component 40 from swaying while moving. Further, it reduces the risk that the light emitting component 40 sways and rests against another section of the housing 10, thus preventing damage to the light emitting component as it protrudes from the through-hole 12. Such a mechanism also reduces the sound produced while the rack 53 is moving. Other examples for moving the rack 53 includes using a depression bar.

In some embodiments, the housing 10 includes a decorative housing 14 and an installation housing 15. The closing device is positioned on or around the installation housing 15. In an embodiment, the housing 10 is preferably formed to have an appearance of a conventional candle. The cross section of the housing 10 can be in the shape of a triangle, a square, an eclipse or can have an irregular shape. The housing can also include features that with an appearance of a path of melted wax that has dripped around the housing 10, so as to imitate a used candle. The decorative housing 14 can comprise any one or combination of wax, paraffin, plastic, glass, metal, ceramics, crystal, or polymer material. The top of the electronic candle can be flat or can have a concave shape for imitating a brand new, unused candle, or a candle that has been used for a while, respectively.

In some embodiments, the electronic candle can further include an electrical power receiver connectable to a power source. In particular, a power line or a power connector can have a magnet and the electrical power receiver on the candle device can include a magnetic member. The magnet can be attracted to the magnetic member. When the electronic candle needs to be recharged, the power line or the external power source connector can be attached to the electrical power receiver. After the power line or the connector has been plugged into a power source socket, power is supplied to the electronic candle or is used to recharge a battery via the power line and the electrical power receiver. After the battery has been fully recharged or the electronic candle has been turned off, the power line can be removed from the electrical power receiver so as to be packed up conveniently. This can ensure the overall aesthetic quality of the electronic candle is preserved. The magnetic member can be a magnet or an electromagnet that attracts the magnet on the power line, or can be made of a metallic material that can be attracted to the magnet. In an embodiment, the electronic candle can further include a recharging dock. The user can put the electronic candle on the recharging dock for recharging. Further, the recharging dock can be in a shape of candle holder, such that the electronic candle will look more like a real candle. In one embodiment, the battery can be a lithium ion battery. Typically, the battery can be fully recharged in 1.5-2 hours. In other embodiments, the electronic candle uses dry batteries, external power sources or other power sources. In some embodiments, the power line can be directly affixed onto the electronic candle, forming a one piece structure, so as to prevent the power line from being lost. In one embodiment, the battery can be recharged using solar energy. In this case, when the battery is not being used, the solar energy can be converted into electrical power for storing and supplying the electronic candle.

In an embodiment, the electronic candle can further include a control component that includes a controller and a timer connected with the controller. The time required for the transfer device to drive the light emitting component to protrude from the housing or hide in the housing can be constant. In one scenario, when the light emitting component starts moving, the timer is started. The timer transmits an electrical signal upon expiry of the timer interval, at which time, the light emitting component has protruded from the housing or is hidden in the housing. The controller receives the electrical signal from the timer and stops the transfer device in response to the electrical signal. In some embodiments, the timer can be replaced with a position sensor or a touch sensitive switch. In one embodiment, the control component includes a controller and a position sensor. The position sensor is configured to detect a position of the light emitting component. When the light emitting component protrudes from the housing or is retracted in the housing, the position sensor transmits an electrical signal. The controller receives the electrical signal and stops the transfer device in response to the electrical signal. In another embodiment, the control component includes a controller and a touch sensitive switch. When the light emitting component protrudes from the housing or is retrieved into the housing, the light emitting component makes contact with the touch sensitive switch and the touch sensitive switch transmits an electrical signal. The controller receives the electrical signal and stops the transfer device in response to the electrical signal.

Referring to FIGS. 4-6 and 9-11, a set of example operations of the electronic candle are described below.

As shown in FIGS. 4 and 9, before the electronic candle is turned on, the wick protrudes from the through-hole and the light emitting component is hidden in the housing. In one example, as shown in FIGS. 5-6 and 10-11, after the electronic candle has been turned on, the magnet on the flame sheet is attracted to the electromagnet on the base. The driver causes the gear component to rotate, which in turn drives the rack to move upwards, carrying the light emitting component to the top. As the light emitting component is moved upwards, the base of the light emitting component exerts forces to the left and to the right force onto the two closing members, causing the closing members, and thus the through-hole, to open gradually. The spring is compressed (accumulating energy), and the wick moves with the closing members into the housing. Once the wick makes contact with the top plate of the housing, the wick moves downwards to hide in the housing. The torsional spring accumulates energy. When the light emitting component reaches a predetermined position, the driver stops. The direction of the current in the electromagnet is altered and the attractive force between the electromagnet and the magnet is replaced with a repulsive force. With the action of the repulsive force, the flame sheet sways. The control device turns on the light source. Conversely, after the electronic candle has been turned off, the driver drives the gear component to rotate, which in turn drives the rack to move downwards, carrying the light emitting component to move downwards, as well. The elastic force of the spring is applied to the closing members, driving the closing members to close the through-hole gradually. The contact between the wick and the top plate is gradually reduced. Under the force applied by the torsional spring, the wick gradually protrudes from the housing. When the light emitting component reaches a predetermined position, the driver stops and the electromagnet is powered off.

Figure 12:
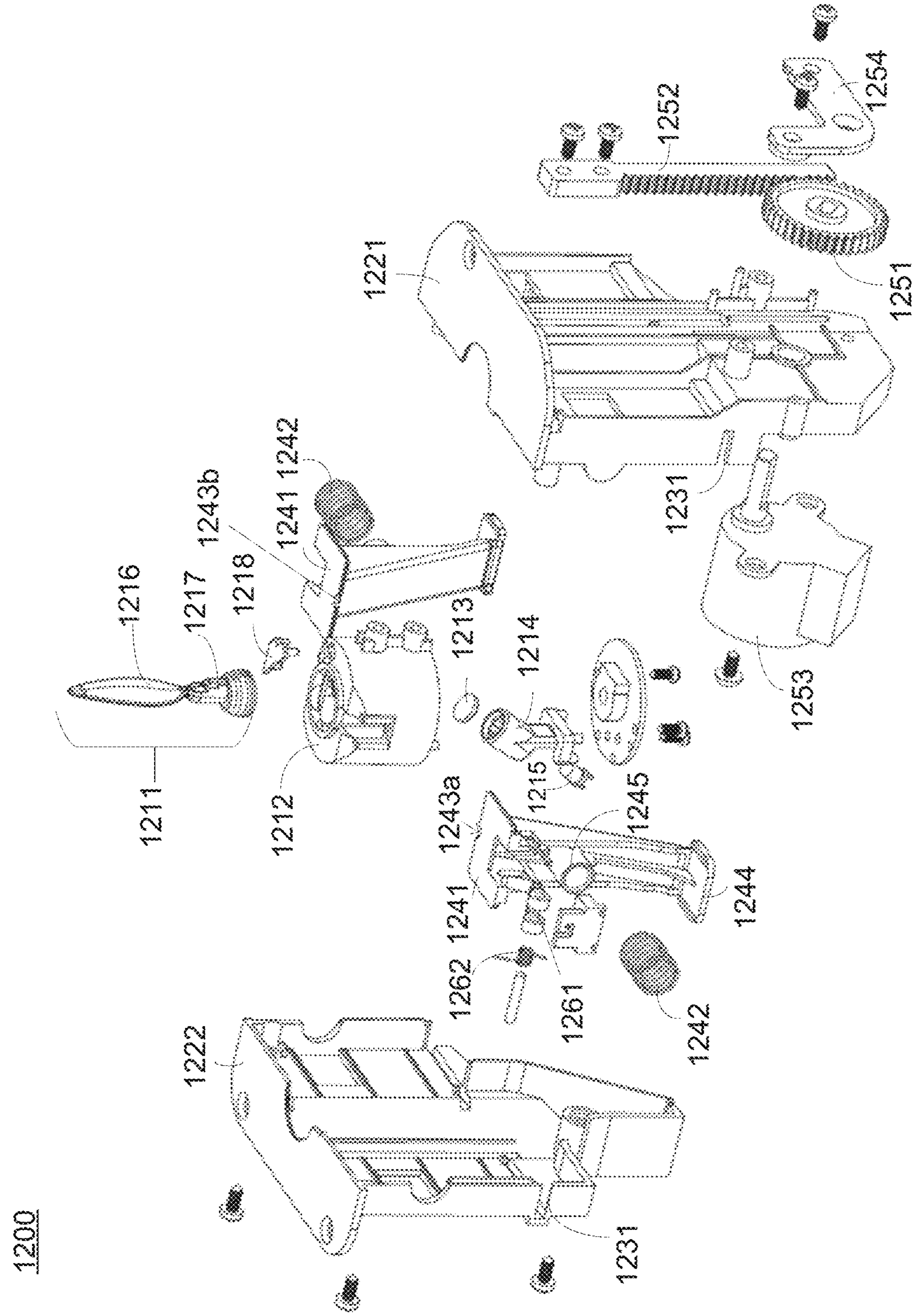
FIG. 12 illustrates an exploded view of example components of an electronic candle in accordance with one or more embodiments of the present technology.

FIG. 12 is an exploded view of example components of an electronic candle in accordance with one or more embodiments of the present technology. The electronic candle 1200 includes a light emitting component that comprises a flame element 1211 and an enclosure 1212. A lens 1213 and its supporting bracket 1214 can be placed within the enclosure 1212. One or more light sources 215 (e.g., one or more light-emitting diodes) can be positioned at the bottom of the supporting bracket 1214 of the lens 1213 such that the lens 1213 can receive light from the one or more light sources 1215 and direct the received light towards the flame element 1211.

In some embodiments, the thickness of the flame sheet 1216 of the flame element 1211 is not uniform and is preferably thinner in its upper portion and thicker in its lower portion. Alternatively, the flame sheet 1216 can have a thicker middle portion and thinner end portions, so as to imitate light effects at different heights of a flame, thereby making it look more like a real flame. In some embodiments, the flame sheet 1216 has a pivot hole and a support element, e.g., a V-shape rigid pole, can be provided on the base 1217. That is, the middle portion of the support element, in its stable state, can serve as an end portion which is at a lower position to allow the flame sheet 1216 to be supported by the support element. In one embodiment, the lowest point of the support element has unequal distances to its two ends, i.e., it is closer to one of the ends than to the other, such that light source 1215 can better illuminate to the light emitting upper portion of the flame-shape element. It can be appreciated by those skilled in the art that the flame-shaped element is not limited to the flame sheet and can be e.g., a three-dimensional flame or a flame consisting of several plates.

In some embodiments, the enclosure 1212 further includes a sensor 1218. The sensor 1218 can be connected to a control device or a controller of the electronic candle 2000. The sensor 1218 is configured to receive an external input and convert the received external input into an electrical signal for inputting to the control device. The sensor collects an external signal such as sound, air flow and pressure, and converts the external signal into an electrical signal. The control device controls the operation state of the electronic candle in response to the electrical signal. In particular, the user can control the on or off functionality of the electronic candle or control its operation state by means of voice control or pressure control. Alternatively, the user can blow or fan the electronic candle to extinguish its flame. The sensor collects air flow and converts it into an electrical signal. The control device receives the signal and extinguishes the flame of the electronic candle in response to the signal. Further, the control device can control a smoke generator to generate smoke, so as to imitate the smoke generated when a real candle is extinguished, making it look more like a real candle.

In some embodiments, the sensor can be a sound sensor configured to sense a sound wave and convert it into an electrical signal for inputting into the control device. The user can control an operation of the electronic candle with his/her voice. In particular, the sound sensor can capture a sound wave from the user and convert it into an electrical signal. The control device receives the electrical signal and controls the operation of the electronic candle based on the signal, e.g., controls on/off, or a timer functionality of the electronic candle. In particular, the user can awaken the electronic candle by voice, e.g., by saying "Hello Scent" or "Hello Candle." It can be appreciated by those skilled in the art that the above voice control and control function are exemplary only and the user can control any other functions as desired by using a voice control product or set any desired words recognizable by the electronic candle. The sound sensor can be a microphone. The sound sensor can recognize a number of languages, such as Chinese, English, Japanese, Korean, etc. While the user is interacting with the electronic candle by voice, the electronic candle can feed voice content back to the user, thereby allowing for voice interaction. The electronic candle may have a power amplifier circuit and a speaker therein.

FIG. 12 further illustrates an example of a transfer mechanism that can be used in the electronic candle 1200. The transfer mechanism is coupled to a shell to secure various components. In this particular example, the shell includes a first half-shell 1221 and a second half-shell 1222. The first half-shell 1221 and the second half-shell 1222 can be assembled to create a modular component that encloses the light emitting component, the transfer mechanism, and other components that will be described in detail below.

As shown in FIG. 12, the first half-shell 1221 is coupled to one or more gears of the transfer mechanism. The one or more gears includes at least one gearwheel 1251 and a gear rack 1252. In some embodiments, the transfer mechanism includes only one gearwheel. The small number of gear components can minimize friction, thereby reducing noise and facilitating easy assembly.

In some embodiments, the top part of the gear rack 1252 is coupled to the enclosure 1212 of the light emitting component via one or more attaching members (e.g., screws) such that the vertical movement of the gear rack 1252 causes the enclosure 1212 and the flame element 1211 to move up and down. The gearwheel 1251 can be coupled to a moving mechanism 1253 (e.g., a motor). The moving mechanism 1253 can be powered electronically (e.g., by connecting to a power supply of the electronic candle 1200) or manually (e.g., by the user) to drive the rotational movement of the gearwheel 1251. The teeth of the gearwheel 1251 and the gear rack 1252 are engaged, thus the gear rack 1252 moves correspondingly in the vertical direction to physically move the light emitting component up and down in the electronic candle's housing. In some embodiments, the gearwheel 251 and the gear rack 1252 are secured by a gear plate 1254 via one or more attaching members (e.g., screws). The gear plate 1254 can stabilize the gear components during their movements to reduce friction and noise.

FIG. 12 also illustrates a two-section lid of the electronic candle 1200. Each section includes a closing member 1241 and a reposition mechanism 1242. The closing member 1241 includes a movable lid such as shown in FIG. 1. The closing member 1241 can include a small groove 1243*a*, 1243*b* to form a wick hole when the two portions are substantially closed.

In some embodiment, each section of the lid further includes a slider 1244. A sliding slot can be positioned within the housing to allow the two sections to slide within the housing. For example, in the embodiment shown in FIG. 12, the first half-shell 1221 and the second half-shell 1222 form a sliding slot 1231 to allow the slider 1244 of each of the sections to slide therein. The sliding slot 1231 prevents the lid from swaying while it is moving, so as to ensure its stability during the movement. At the same time, the noise generated due to the movement of the closing member 1241 is reduced, which improves the operations of the device.

The reposition member 1242 is in contact with the closing member 1241 within the shell 1221, 1222. When the closing member 1241 of each section opens, it exerts a force onto the reposition member 1242 such that the reposition mechanism 1242 is wound up. When the closing member 1241 of each portion closes, the reposition mechanism 1242 applies a force to the closing member 1241 such that the closing member 1241 substantially closes the through-hole to prevent dust from falling onto the candle 1200.

In some embodiments, the reposition mechanism 1242 is a spring. A position limiting pole 245 corresponding to the size of the spring is positioned within the shell 1221, 1222. The spring 1242 has one end that is connected to the position limiting pole 1245. The other end of the spring 1242 rests against the inner wall of the shell 1221, 1222. When the closing member 1241 opens the through-hole, the distance between the closing member 1241 and the inner wall of the shell 1221 is shortened and the spring 1242 is compressed by the closing member 1241. When the closing member 1241 closes the through-hole, the elastic force of the spring 1242 is applied to the closing member 1241 such that the closing member 1241 is moved, subject to the action of the spring, to close the through-hole to prevent dust from falling onto the light emitting component. In some embodiments, the reposition mechanism includes an elastic member that can exert a force to the closing members 1241 to close the sections of the lid.

In some embodiments, the lid includes a wick component coupled to the closing member 241. The wick component a wick 1261, and a spring 1262 coupled to the wick and the closing member 241. The spring 1262 stores energy when the closing member 1241 is in the open configuration and releases the stored energy when the closing member 1241 transitions to the closed configuration. The wick 1261 includes a dark section resembling a wick of a used candle. In some embodiments, the wick 1261 can be in a light color (e.g., white or beige) to resemble a candle that has never been lit.

Figure 13:
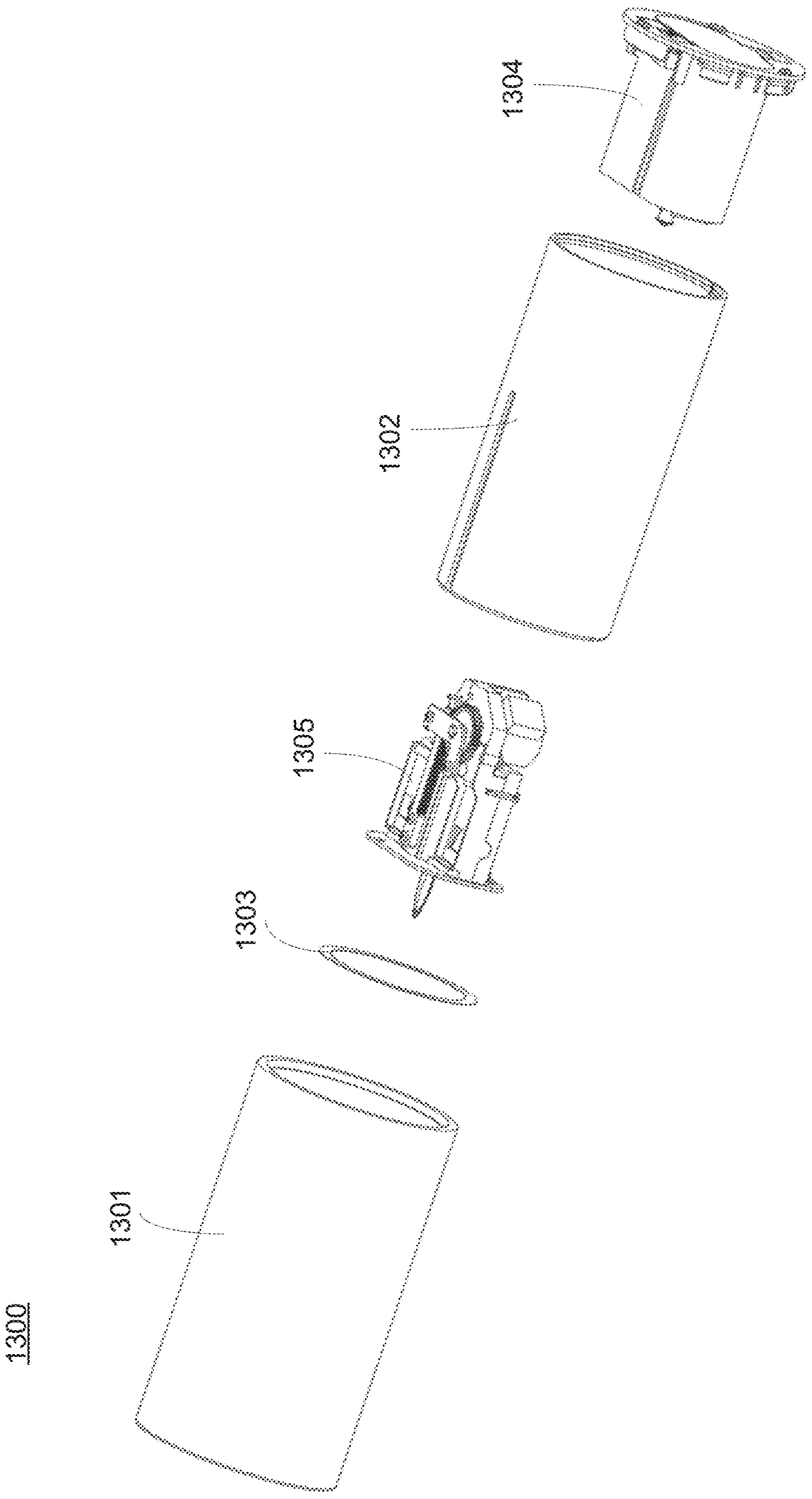
FIG. 13 is a schematic diagram illustrating a modular component of an electronic candle in accordance with one or more embodiments of the present technology.

FIG. 13 is a schematic diagram illustrating a modular component of an electronic candle in accordance with one or more embodiments of the present technology. The electronic candle 1300 includes an outer housing 1301 (e.g., in wax) and inner housing 1302 (e.g., plastic). A sensor 1303 is positioned below the top surface of the outer housing to detect changes in capacitance so as to control the functionality of the electronic candle 1300. In some embodiments, the senor 1303 is a capacitive sensor. The user touches the electronic candle, which causes a change in capacitance of the capacitive sensor. The change in capacitance is converted into an electrical signal that is inputted to the control device, which can allow the user to control a functionality of the electronic candle by touching it. The sensor can alternatively be a pressure sensor to sense the pressure applied to the electronic candle and convert the pressure into an electrical signal for inputting into the control device. The user can control the operations or a functionality of the electronic candle by touching it. In one example, upon sensing a user's touch—such as a touch on the top surface or a section close to the top of the candle device, the flame-like element may be retracted into the candle device, and the light source may be turned off. Similarly, upon detection of the user touch when the flame element is in retracted position, the flame element may start its ascent to protrude from the candle device, and the light source may turn on. It is noted that the capacitive sensor can be provided anywhere on the electronic candle.

The electronic candle further includes a battery compartment 1304. The control device, which is in communication with the capacitive sensor, can be positioned above or in proximity to the battery compartment 1304.

As shown in FIG. 13, the light emitting component and the lid are all enclosed in the shell of the transfer mechanism to form a modular component 1305. Because all the movable components are coupled and/or secured with respect to the shell, the movement of these components introduces less noise. The modular component 1305 can be used in electronic candles of variable heights. For example, the same modular component 1305 can be used in a 9-inch tall electronic candle and/or a 7-inch tall electronic candle, thereby simplifying the assembly process for electronic candles of different sizes.

Figure 14A:
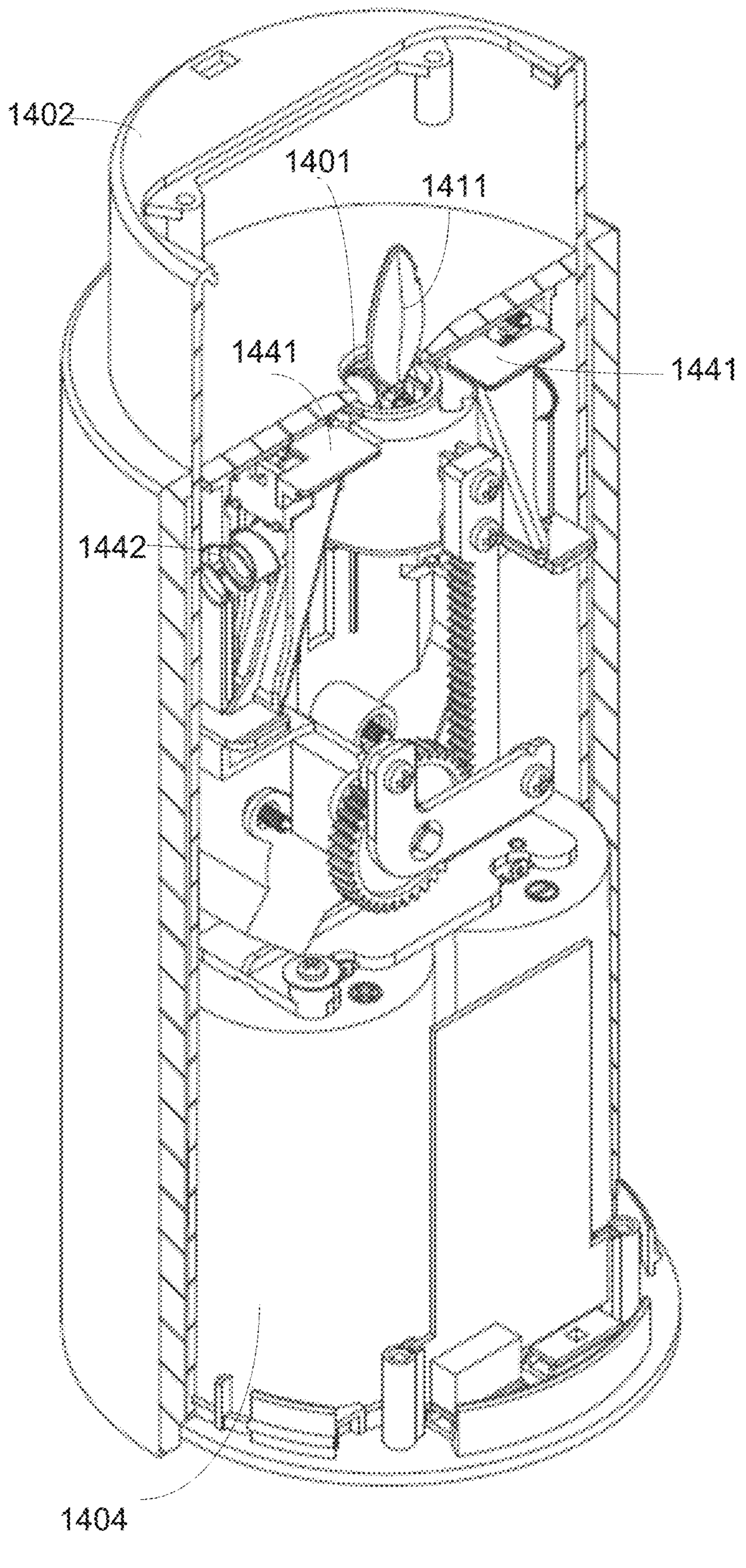
FIG. 14A is a schematic diagram illustrating a light emitting component protruding outside of a housing of an electronic candle in accordance with one or more embodiments of the present technology.

FIG. 14A is a schematic diagram illustrating a light emitting component protruding outside of a housing of an electronic candle in accordance with one or more embodiments of the present technology. In this embodiment, the electronic candle 1400 has is turned on. Two closing members 1441 of the lid move away from each other, allowing the flame element 1411 of the light emitting component to protrude outside of the housing via the through-hole 1401. A reposition mechanism 1442 (e.g., a spring) corresponding to each closing member is compressed against the inner wall of the shell.

Figure 14B:
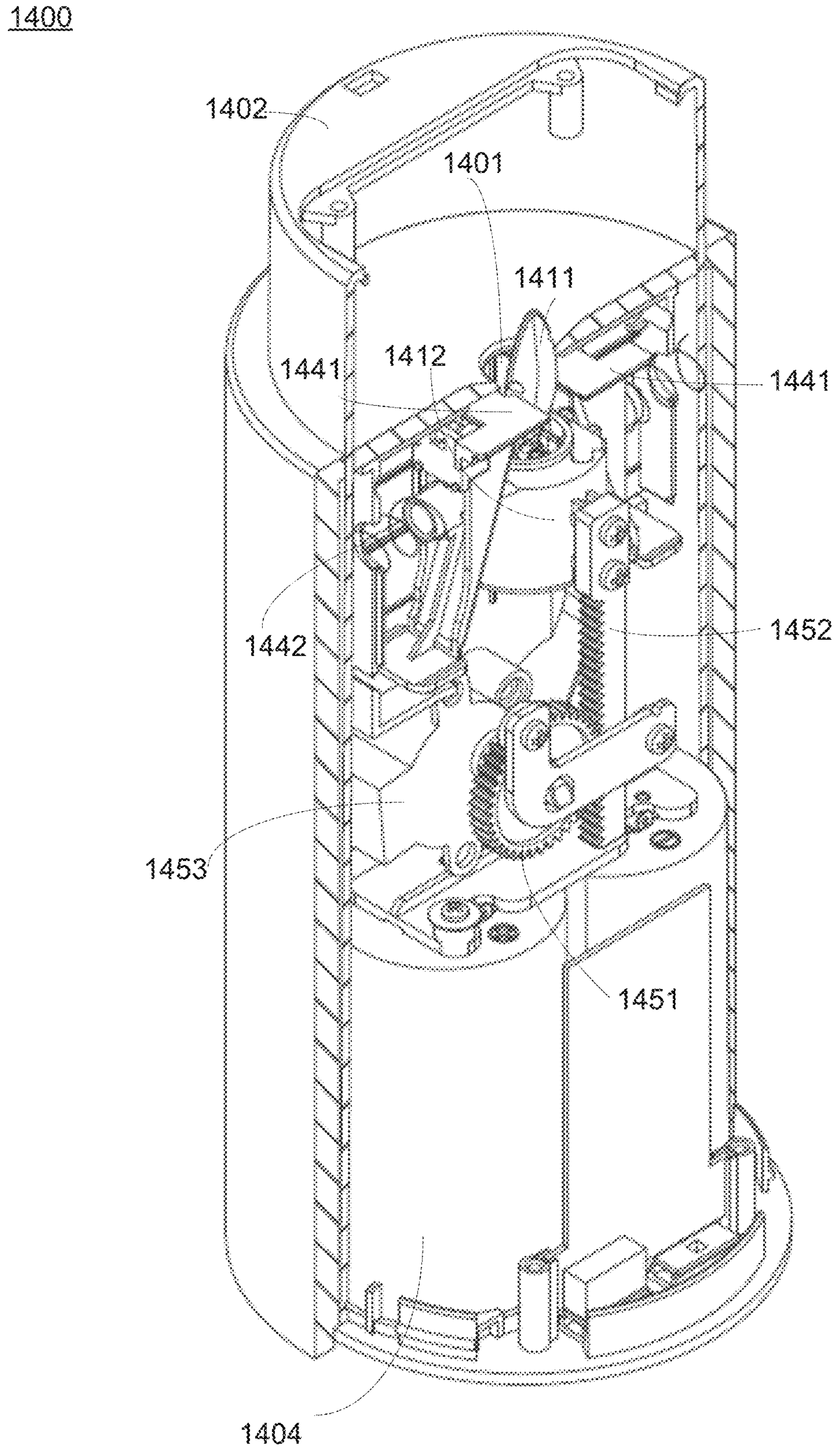
FIG. 14B is a schematic diagram illustrating a light emitting component retracting through a through-hole of an electronic candle in accordance with one or more embodiments of the present technology.

FIG. 14B is a schematic diagram illustrating a light emitting component retracting through a through-hole of an electronic candle in accordance with an example embodiment of the present technology. In this embodiment, the electronic candle 1400 can be turned off by a user blowing air towards the candle. For example, upon detection of a blow by a sensor, a control signal can be generated to trigger the retraction mechanism. The electronic candle 1400 can also be turned off manually or using a remote control. The control device of the electronic candle 1400 transmits a signal to activate the moving mechanism 1453 (e.g., a motor), thereby driving the movement of the gearwheel 1451 and the gear rack 1452. The enclosure 1412 is coupled to the gear rack 1452 via one or more screws, thus the movement of the gear rack 1453 causes the enclosure 1412 and the flame element 1411 to move downwards vertically through the through-hole 1401. At the same time, the two closing members 1441 of the lid move towards each other by the force exerted by the reposition mechanisms 1442 (e.g., the spring). Each closing member includes a movable surface to close the through-hole 1401.

Figure 14C:
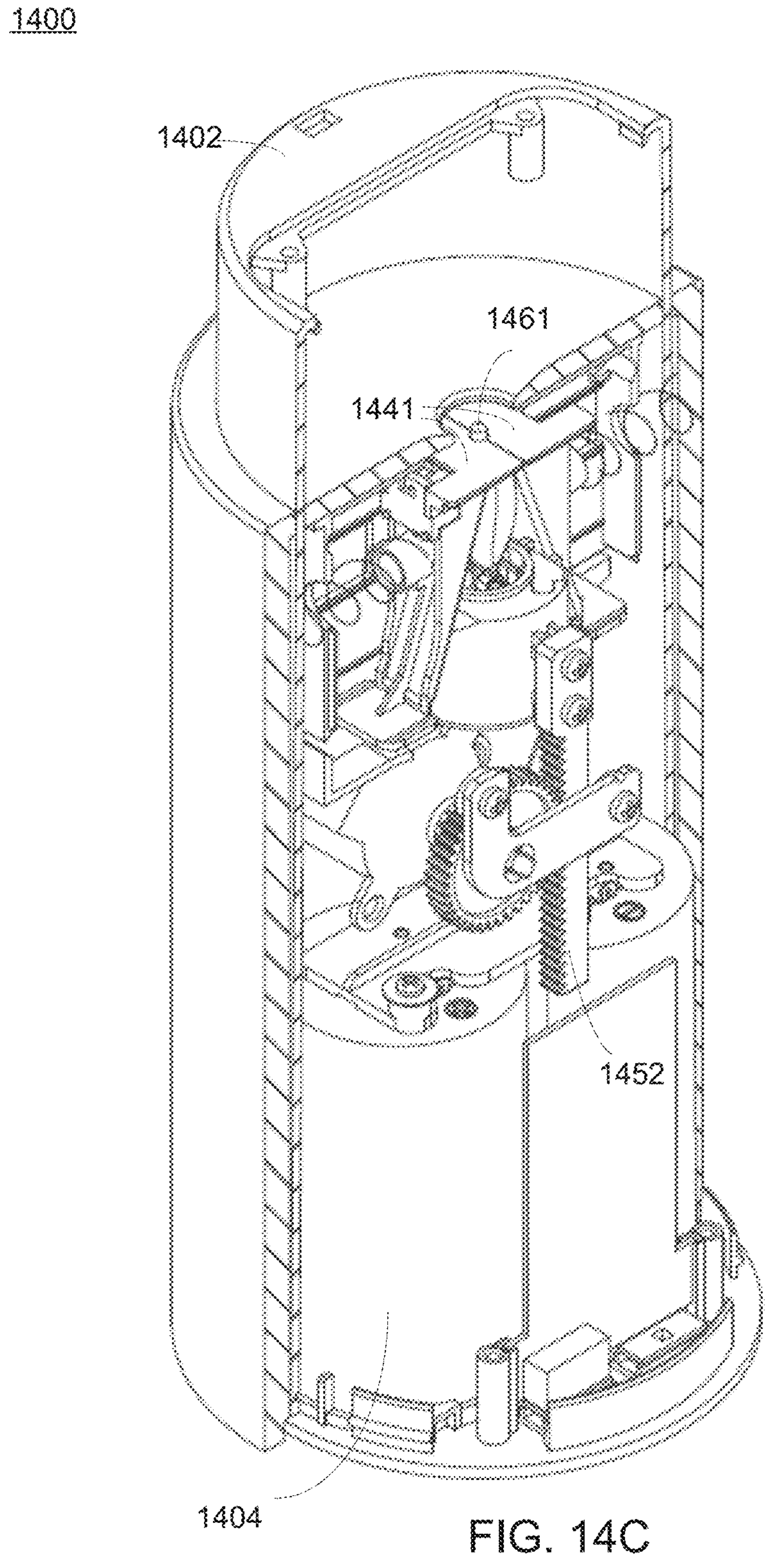
FIG. 14C is a schematic diagram illustrating a light emitting component retracted within a housing of an electronic candle in accordance with one or more embodiments of the present technology.

FIG. 14C is a schematic diagram illustrating a light emitting component retracted within a housing of an electronic candle in accordance with one or more embodiments of the present technology. In this embodiment, the electronic candle 1400 has been turned off. The gear rack 1452 has moved closer to the bottom of the component shell. The two closing members 1441 of the lid have substantially closed the through-hole. A wick 1461 is now protruding through a wick hole that is formed by the small grooves of the closing members 1441. The bottom sections of the closing members form a channel within with the light emitting component is positioned and rests against each of the two closing members.

As shown in FIGS. 14A-14C, the modular design allows the same component to be used in electronic candles of various heights. Here, a tall inner housing 1402 is used. A shorter inner housing or a talker outer housing can be used without impacting the movable components of the candle. Similarly, the size of the battery compartment 1404 can also be changed without impacting the movable components, thereby simplifying the manufacturing and assembling processes.

It is noted that the movable components in the present disclosure, such as the transfer mechanism, the lid, and the wick component can utilize mechanical linkages for achieving the respective actions in different states. In particular, such linkages can be implemented using one or more of gear members, a spring member, a cam member or a connecting rod member. Further, these movable components can move independently from each other, or in cooperation with each other, for achieving the respective actions in different states. In particular, the timing of movements and trajectories of the respective movable components that move independently from each other can be controlled according to a defined procedure to allow coordination of the components.

In the present disclosure, the terms such as "first" and "second" are only for the purpose of illustration and they do not indicate or imply any relative importance. The term "a plurality of" means two or more, unless indicated otherwise explicitly. The term "connected" may refer to "connected directly" or "connected via an intermediate component". In the above description, it is to be noted that the terms indicating directions or positional relations, such as "up" and "down", indicates directions or positional relations as shown in the figures. They are for the purpose of simplifying description of the present disclosure, and do not indicate or imply that the device or unit in question should always be construed to have a particular direction or operate in a particular direction.

Some of the components or modules that are described in connection with the disclosed embodiments can be implemented as hardware, software, or combinations thereof. For example, a hardware implementation can include discrete analog and/or digital components that are, for example, integrated as part of a printed circuit board. Alternatively, or additionally, the disclosed components or modules can be implemented as an Application Specific Integrated Circuit (ASIC) and/or as a Field Programmable Gate Array (FPGA) device. Some implementations may additionally or alternatively include a digital signal processor (DSP) that is a specialized microprocessor with an architecture optimized for the operational needs of digital signal processing associated with the disclosed functionalities of this application.

Some of the embodiments related to operations such as processing of signals or performing certain tasks and processes, described herein are described in the general context of methods or processes, which may be implemented at least in-part by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), Blu-ray Discs, etc. Therefore, the computer-readable media described in the present application include non-transitory storage media. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

The foregoing is merely illustrative of the preferred embodiments of the present disclosure and is not intended to limit the present disclosure. Various changes and modifications may be made by those skilled in the art. Any modifications, equivalent alternatives are improvements that are made without departing from the spirit and principles of the present disclosure are to be encompassed by the scope of the present disclosure.

What is claimed is:

1. A electronic candle component in an electronic candle, comprising:

a component shell, a transfer mechanism enclosed by the component shell, the transfer mechanism including a driver motor positioned inside the component shell;

a light emitting component coupled to the transfer mechanism such that the transfer mechanism causes the light emitting component to move vertically up or down; and a lid positioned inside the component shell and movable to remain in at least one of an open configuration or a closed configuration, the lid comprising a spring and two sections, wherein the spring is located between an inner wall of the component shell and one of the two sections, the spring being in a compressed state to retain the two sections away from each other in the open configuration and to allow at least part of the light emitting component to protrude upwards between the two sections, the spring further configured to transition to a decompressed state to exert a force to at least one section of the lid to allow the two sections to come together.

2. The electronic candle component of claim 1, wherein the component shell comprises:

a first half-shell; and a second half-shell coupled to the first half-shell to form the component shell.

3. The electronic candle component of claim 1, wherein the component shell comprises at least one sliding slot, and wherein each of the two sections of the lid comprises a slider configured to slide within the component shell via the at least one sliding slot.

4. The electronic candle component of claim 1, further comprising:

a wick component coupled to the lid, wherein the wick component is configured to retract into the component shell in the open configuration and to protrude from the component shell in the closed configuration.

5. The electronic candle component of claim 4, wherein the wick component includes a dark section.

6. The electronic candle component of claim 4, wherein the wick component has a light color.

7. The electronic candle component of claim 1, wherein each of the two sections of the lid includes a groove to form a wick hole upon the two sections of the lid coming together in the closed configuration, the wick hole configured to allow a wick to protrude upward from the wick hole.

8. The electronic candle component of claim 1, wherein the transfer mechanism includes a single gearwheel and a gear rack, the gear rack coupled to the light emitting component to cause the light emitting component to move vertically up or down.

9. The electronic candle component of claim 8, wherein the light emitting component is positioned within an enclosure, and wherein a top part of the gear rack is coupled to the enclosure such that vertical movement of the gear rack causes the enclosure and the light emitting component to move up and down.

10. The electronic candle component of claim 8, wherein the single gearwheel is coupled to the driver motor that is operable electronically.

11. The electronic candle component of claim 8, wherein the transfer mechanism further comprises a plate, wherein the single gearwheel and the gear rack are secured against the plate.

12. The electronic candle component of claim 1, wherein the light emitting component includes a flame sheet that resembles a real candle flame.

13. The electronic candle component of claim 12, wherein the light emitting component includes one or more light sources to illuminate the flame sheet.

14. The electronic candle component of claim 1, wherein the light emitting component includes at least one light source that is configured to project light onto a flame element when the flame element is positioned to protrude from the component shell, and to turn off the light when the flame element is not protruding from the component shell.

15. The electronic candle component of claim 14, wherein the light emitting component further includes a lens positioned to receive light from the at least one light source and to redirect the light onto the flame element when the flame element is positioned to protrude from the component shell.

16. The electronic candle component of claim 1, wherein the component shell and enclosed components thereof are adapted to fit in an electrical candle having a height of 9 inches.

17. The electronic candle component of claim 1, wherein the component shell and enclosed components thereof are adapted to fit in an electrical candle having a height of 7 inches.

* * * * *